May 27, 1969 R. W. FOSTER-PEGG 3,446,014
PULVERIZER
Filed Jan. 17, 1968

United States Patent Office 3,446,014
Patented May 27, 1969

3,446,014
PULVERIZER
Richard W. Foster-Pegg, Warren, Pa., assignor to Struthers Energy Systems, Inc., a corporation of Delaware
Filed Jan. 17, 1968, Ser. No. 698,652
Int. Cl. F02c 3/06, 3/10, 3/26
U.S. Cl. 60—39.18                      6 Claims

ABSTRACT OF THE DISCLOSURE

A combined steam and gas turbine plant operates on coal which is partially burned under pressure to provide combustible gases which are further burned to operate a gas turbine. Resulting hot char is pulverized in a fluid energy pulverizer and burned at a lower pressure in a furnace to generate steam with exhaust gases from the gas turbine. The fluid energy pulverizer may be operated by combustible gases from the partially burned coal or by lean gapor produced by the pretreatment of the coal.

---

This invention relates to a combined steam-gas turbine plant to be operated upon a fuel such as coal, for the generation of useful energy.

It has long been recognized that the combined use of steam and gas turbines offers a substantial reduction in heat rate. Several plants of this type are presently in operation but, to date, only fuels with small ash content can be used in the gas turbine. Combined power plants will not be generally accepted until they can be operated economically on coal because this is by far the most abundant and, in most localities, the cheapest fuel.

In accordance with the present invention, I provide a steam-gas turbine plant which can be operated using coal as a source of energy. In this plant, coal is carbonized in a carbonizer, the gaseous products evolved being utilized to drive the gas turbine, while the hot solid portion remaining following release of the volatile products is pulverized and is passed into a boiler fire box along with the hot air and products of combustion issuing from the gas turbine.

Before the coal enters the carbonizer it is pretreated to produce non-caking coal and a mixture of gases and vapors, termed lean gapor which has negligible chemical energy. Lean gapor is essentially a mixture of the inherent moisture of the coal, carbon dioxide, and nitrogen. This gapor is practically inert but contains appreciable pressure energy because the process is carried on at a pressure exceeding 100 p.s.i.a.

The char which is burned in the boiler must be pulverized prior to firing and it has been found that commercial equipment for mechanical pulverizing hot char at 900° F. does not exist. Mechanical pulverizing equipment would necessitate cooling of the char and additional equipment and heat loss.

Alternately, a fluid energy pulverizer appears well suited to operate on hot char due to a complete absence of moving parts. Furthermore, the lean gapor from the pretreated vessel for which there is no other prime use can be used to provide the necessary energy. Use of the lean gapor has the additional advantage of a low oxygen content thus avoiding combustion of the hot char in the mill.

The additional equipment and performance loss associated with cooling the char for pulverization is eliminated and pulverization is accomplished by equipment which is mechanically simpler than conventional equipment and therefore holds the promise of greater reliability and easier maintenance. Normal fluid energy pulverizers operate on the injector principle in which the solid material is initially at atmospheric or low pressure. They are thus limited to the relatively low efficiency inherent with injectors.

In the carbonizer cycle of this invention advantage is taken of the high pressure of the char to be pulverized by mixing it with the lean gapor at the same pressure upstream of an accelerating nozzle. By this procedure an efficiency much higher than in normal fluid energy pulverizers is achieved. As in the case of other fluid energy pulverizers the particles are pulverized when they strike a target located close to the discharge end of the nozzle or when they collide with other particles leaving other opposed nozzles.

A preferred arrangement utilizes a target and is incorporated in a burner of the char furnace.

In the case of the carbonized combined cycle, lean gapor from the pretreater flows in the nozzle at a velocity close to sonic velocity. The char product from the carbonization vessel is injected into this gas stream immediately ahead of the nozzle. Because the velocity of the gas is much higher than the velocity of the solid char particles, a sizeable drag force is exerted on the solid particles with the result that they accelerate as they travel through the nozzle with the lean gapor. By the time these particles leave the nozzle, their velocity is approximately 80% of the velocity of the gas and in excess of 700 ft. per second. As a result of impacting the target they are pulverized and then swept by the lean gapor into the integral combustion chamber immediately downstream of the target.

Gas turbine exhaust gas, or air, is introduced into the combustion chamber through burner swirl vanes in sufficient quantities for efficient combustion of the pulverized char fuel.

It should be emphasized that the application of this fluid energy pulverizer should not be limited to the carbonized coal fired combined cycle. This type of pulverizer burner combination has application in any process where the solid to be pulverized is at a higher pressure than it is to be burned.

The nozzle and target of the pulverizer burner should be made of refractory material. Its simplicity with no moving parts results in low cost.

Tests of the pressurized type nozzle of this invention have shown that pulverization is adequate in one pass thus rendering classification unnecessary which will be explained by a more uniform particle velocity at impact than in an injector system. The absence of a classifier permits the pulverizer to be incorporated in the furnace burner with great simplification of the overall system and cost reduction.

It is, in general, the broad object of the present invention to provide an improved combined steam-gas turbine plant capable of using a solid fuel such as coal as the sole energy source.

A further object of the present invention is to provide a combined steam-gas turbine plant in which a non-premium ash burning fuel, such as coal, is carbonized to evolve gaseous products which are utilized to drive a gas turbine and a char which is thereafter pulverized and then utilized in a boiler along with exhaust gases from the gases from the gas turbine, to provide steam.

In accordance with this invention, coal is separated into two portions, namely, a volatile portion and a solid char residue made up of a solid combustible portion, ash and a proportion of a volatile matter of the coal. The volatile portion is immediately and without significant heat loss employed to drive a gas turbine. The char or residue is pulverized to finely divided form and is thereafter burned in a boiler in the atmosphere provided by the exhaust gas from the gas turbine. In this manner, the heat content of the exhaust gas is utilized fully.

The problem of handling, recovering and purifying tars in conventional carbonization processes is avoided because the volatiles driven from the coal are conveyed to the gas turbine in a heated state so that none of the sensible heat of the volatile is lost and no tar is deposited. The carbonizer is operated at a pressure sufficiently in excess of the gas turbine pressure to enable any solid residue such as dust and char to be removed in conventional separators whereby residues that might damage the turbine are extracted. The char and dust separated from the volatiles are directed to the steam boiler where solids are not objectionable.

The char discharged from the carbonizer will be incandescent and at relatively elevated temperature of the order of 900° F. to 1200° F. Handling of the char so that it can be burned in the steam boiler therefore presents a substantial problem. In accordance with this invention, I may introduce the incandescent char into a pulverizer wherein the char is reduced in size in an atmosphere provided by a portion of the volatile gas stream. In this manner, burning of the char is avoided while heat loss is held to a minimum. Further, and in accordance with the preferred practice of this invention, size reduction of the char is effected in a fluid energy mill utilizing the fluid energy of the portion of the volatile gas stream. Fluid energy mills are well known and one can refer to Patents 2,032,827 and 2,284,746 for typical mills which can be employed. While pulverization can be achieved in mechanically driven devices, these are more expensive to construct and operate since they must handle an abrasive material at a relatively high temperature. The stream of fine char in gaseous suspension is sent from the fluid energy mill to the steam boiler.

The term "carbonization" is intended to refer to the driving off of volatiles in coal without gasifying or driving off of a large portion of the fixed carbon as carbon monoxide or dioxide. However, a certain amount of gasification is usually involved in carbonization procedures and this not excluded provided the main products are volatiles and chars. It may also be advantageous to burn some carbon in the carbonizer to release heat for the reaction.

Another embodiment or improvement of this invention consists of pretreating the coal at a relatively low temperature in a pretreatment vessel to produce non-caking coal and a mixture of gases and vapors. This mixture is essentially a mixture of the inherent moisture of the coal, carbon dioxide, and nitrogen. This mixture has negligble chemical energy and is called lean gapor. While the lean gapor is practically inert, it contains appreciable pressure energy as the process of treating the coal for its production takes place at a pressure exceeding 100 p.s.i.a. This lean gapor is used in a special fluid energy pulverized to pulverize char to enable it to be burned in the steam boiler.

A further object of this invention is to provide a superior fluid energy pulverizer for use in a char furnace.

A still further object of this invention is to provide a fluid energy pulverizer and burner combination which may be applied to any process where a solid in a gas suspension is at a higher pressure than that at which it is to be burned.

Many other objects, advantages, and features of invention reside in the particular construction, combination, and arrangement of parts involved in the embodiments of the invention and its practice as will be understood from the following description and accompanying drawings wherein.

Figure 1:
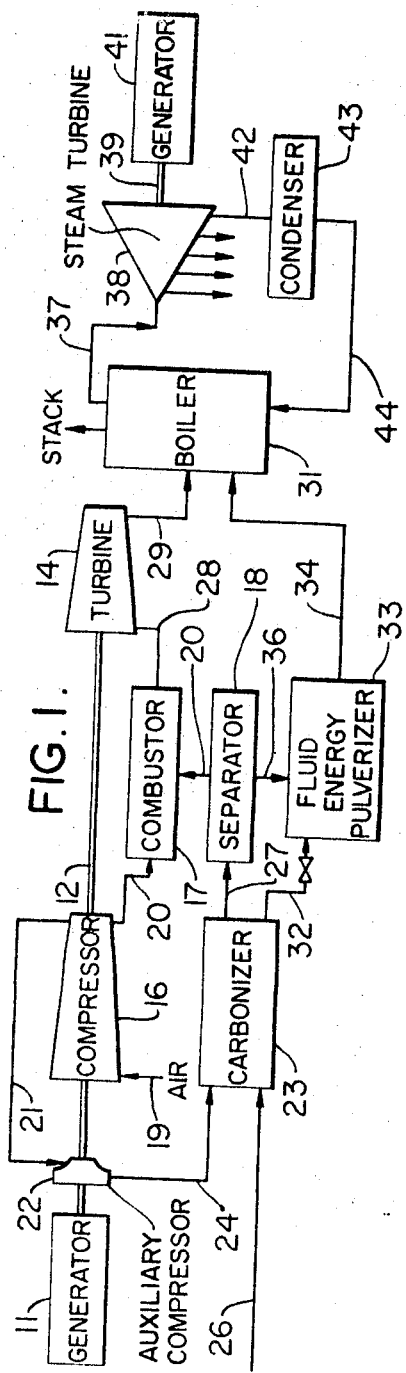
FIGURE 1 is a diagrammatic illustration of a power plant according to this invention.

As shown in FIGURE 1, a first generator 11 is driven by shaft 12 of gas turbine 14. A compressor 16 is also driven by the shaft 12; this delivers air from line 19 through line 20 to combustor 17 and through line 21 to an auxiliary compressor 22 also mounted on the shaft 12. Air from the auxiliary compressor is discharged into the carbonizer 23 through line 24 where it is utilized to burn a part of the coal delivered through line 26. From the carbonizer, the volatiles are taken off through line 27 and introduced into separator means 18 where entrained solids are separated from the gas stream which is sent on through line 20 to the combustor 17. The solids from the separator are sent to the pulverizer 33 through line 36 along with the gas required to operate the fluid energy pulverizer 33.

The hot compressed gases from the combustor 17 are passed through line 28 to the turbine 14, from which hot exit gases and air are passed through line 29 into the fire box of a boiler 31. The solid char in the carbonizer 23 is delivered through line 32 to a fluid energy pulverizer 33 from which the pulverized char is passed in an oxygen-free gas stream through line 34 to the boiler 31.

From the boiler, steam is delivered by line 37 to a steam turbine 38, which drives shaft 39 on which is mounted generator 41. Exhaust steam passes through line 42 into a condenser 43, from which the condensate is returned through line 44 to the boiler.

In the foregoing, various dust collectors, feed hoppers, control valves, and the like have been omitted because the utilization of these will be apparent to those skilled in the art.

As illustrative of the practice of the present invention, 30,000 pounds of fine coal (all —⅛″) were introduced per hour into the carbonizer 23 along with 16,200 pounds of air at 625° F. and 125 lb./ga. The carbonizer was maintained at 115 pounds per square inch at 1200° F. From the carbonizer, 2,000 cubic feet per minute of a hot gas was passed through a suitable series of dust separators, 4500 pounds of char and 5,000 pounds of hot gas being introduced per hour into the fluid energy pulverizer 33 at about 100 pounds per square inch through line 36 along with 13,000 pounds of char and 80 pounds of gas introduced through line 32. The char was at a pressure of about 17 pounds per square inch and 1200° F. Its largest particle size was approximately ⅛″. In the fluid energy pulverizer, it was reduced in size to —200 mesh, the resulting product passing through line 24 at 1200° F. and about 15 pounds pressure into the boiler 31. 23,600 pounds per hour of gas issued from the separator to the gas turbine combustor at 1150° F. and 100 pounds pressure and was burned as fuel in the gas turbine combustor with 350,000 pounds of air entering directly from the compressor. Six thousand horsepower were evolved from the generator 11 and 42,000 horsepower evolved from the generator 41.

In the carbonizer, internal combustion is usually carried out to release the heat necessary for the carbonization operation. Because of this, the gaseous products from the carbonizer may include combustion products. Also, carbonization is not a precise operation and although its purpose is to separate the volatile constituents from the fixed constituents of the coal. This ideal state is not attained in practice and a portion of the volatile matter remains in char which comprises carbon, the ash content, and a portion of the volatile matter in the coal.

Figure 2:
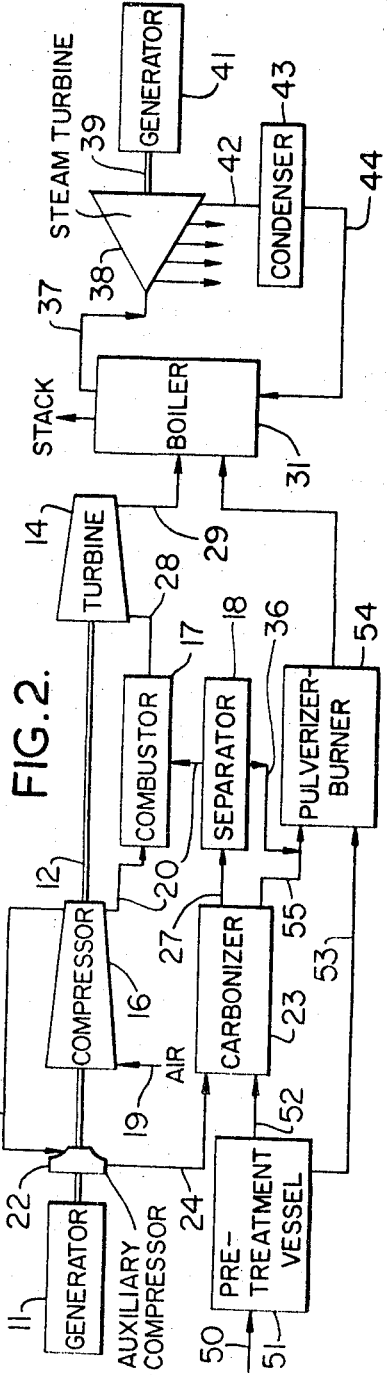
FIGURE 2 is a diagrammatic illustration of an improved power plant using lean gapor in a fluid energy pulverizer according to this invention.

Referring now to FIGURE 2, coal is delivered along line 50 to pretreatment vessel 51. Non-caking coal produced therein passes through line 52 to the carbonizer 23. Lean gapor, as hereinbefore described, passes through line 53 to the pulverizer-burner 54 which will be later described in detail. Solid char from the carbonizer 23 passes through line 55 to the pulverizer-burner 54. Solids from the separator 18 pass through line 36 to be delivered to the pulverizer-burner 54 by line 55. The remaining elements of FIGURE 2 function exactly as do the corresponding and already described elements of FIGURE 1.

Figure 3:
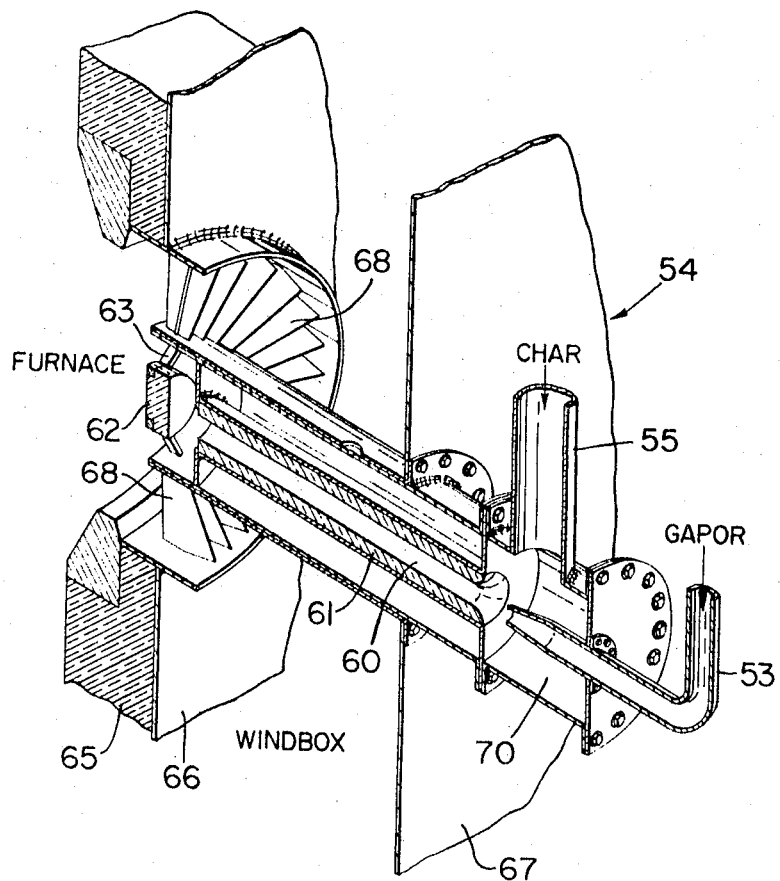
FIGURE 3 is a perspective view showing a pulverizer burner broken away in vertical section and mounted in a furnace according to this invention.

Referring now to FIGURE 3, the fluid energy pulverizer-burner 54 of this invention has gapor and char introduced to it at equally high pressures by lines 53 and 55 at the upstream side of accelerating nozzle 60 which is lined with refractory material 61. A refractory target 62 is supported in front of the end of nozzle 60 by means of radial supports 63.

A windbox 64 is defined by a wall 66 of the furnace 65 and an outer windbox bulkhead 67. Gas turbine exhaust gas from turbine 14, or air, enters furnace 65 from windbox 64 through the burner swirl vanes 68. This gas or air is introduced in sufficient quantities to provide efficient combustion of the pulverized char fuel.

At about 100 p.s.i.a., the velocity of the lean gapor is much higher than the initial velocity of the solid char particles which are substantially at rest as they mix in the induction chamber 70. Thus, a sizeable drag force is exerted on the solid char particles which accelerates them as they travel down the nozzle 60 with the lean gapor. By the time the char particles leave the nozzle 60, their velocity is 80% of the velocity of the lean gapor and is in excess of 700 feet per second. As a result of impacting the target 62, the char is pulverized and swept by the lean gapor into the furnace 65 to burn. As has been stated, the fluid energy pulverizer-burner of this invention may be applied to any process where solids to be pulverized are at a higher pressuer than that at which they are to be burned. The main advantage of the pulverizer of this invention is that, unlike conventional pulverizers, the solids are at a high pressure. In addition, both the char and the lean gapor are at a relatively high temperature to increase the thermal efficiency of combustion.

In summation, this invention involves a fluid energy pulverizer-burner having a nozzle through which gas is exhausted at a high pressure, an induction chamber at the breach end of said nozzle into which solids to be burned are introduced at as high a pressure as said gas, a target against which accelerated gas and solids are directed, and means about the pulverizer-burner introducing an oxidizing gas around gas and pulverized solids flowing past said target.

This invention also involves a power plant having a gas turbine assembly including a gas turbine, a steam turbine, a boiler generating steam for the steam turbine, means directing exhaust gases of said gas turbine to said boiler to provide a combustion atmosphere for said boiler, a carbonizer to carbonizer coal into a volatile component and a solid char, means conveying at least a part of said volatile component to said gas turbine, a pretreatment vessel in which coal is reduced into non-caking coal and lean gapor, means directing the non-caking coal into said carbonizer, a fluid energy pulverizer-burner directed into the combustion atmosphere of said boiler, and means conducting char from said carbonizer and lean gapor from said pretreatment vessel to said pulverizer-burner, said char and said lean gapor being at high pressure, said pulverizer-burner introducing fine char into the combustion atmosphere of said boiler.

What is claimed is:
1. A steam-gas turbine plant comprising, in combination,
(a) an air compressor,
(b) a carbonizer,
(c) means introducing coal into said carbonizer,
(d) means introducing air from said compressor into said carbonizer partially burning coal therein producing hot char and combustion gases,
(e) a gas turbine,
(f) means burning at least some of said combustible gases from said carbonizer to operate said gas turbine,
(g) a furnace,
(h) a fluid energy pulverizer communicating with said furnace,
(i) means introducing hot char and some of said combustible gases into said fluid energy pulverizer so that hot char is pulverized to burn in said furnace,
(j) a boiler in which exhaust gases from said turbine and combustion products from said furnace produce steam, and
(k) a steam turbine operated by steam from said boiler.

2. The combination according to claim 1 with the addition of means introducing exhaust gases from said turbine into said furnace providing a combustion atmosphere.

3. The combination according to claim 1 wherein said fluid energy pulverizer has an accelerating nozzle with a high and a low pressure end, means introducing hot char and an accelerating gas into the high pressure end of said nozzle so that the accelerating gas accelerates the hot char towards the low pressure end of said nozzle, and a target at the low pressure end of said nozzle against which said char impacts to be pulverized.

4. The combination according to claim 3 wherein said furnace has a windbox fed with air under pressure, said windbox communicating with said furnace about said fluid energy pulverizer to burn pulverized char therein.

5. The combination according to claim 4 wherein said windbox is at least partially fed with exhaust gases from said gas turbine.

6. The combination according to claim 3 with the addition of a pretreatment vessel in which coal is heated to produce lean gapor under pressure, means conducting coal from said pretreatment vessel to said carbonizer, and means conducting said lean gapor from said pretreatment vessel to said fluid energy pulverizer for use as an accelerating gas therein.

References Cited
UNITED STATES PATENTS

| | | | |
|---|---|---|---|
| 2,032,827 | 3/1936 | Andrews | 241—5 |
| 2,284,746 | 6/1942 | Kidwell | 241—39 |
| 3,002,347 | 10/1961 | Sprague. | |
| 3,137,133 | 6/1964 | Wilson et al. | 60—39.02 |
| 3,195,306 | 7/1965 | Jonakin. | |
| 3,203,175 | 8/1965 | Michalicka et al. | |
| 3,357,896 | 12/1967 | Gasior et al. | 44—1 |

FOREIGN PATENTS

| | | |
|---|---|---|
| 675,583 | 7/1952 | Great Britain. |
| 904,536 | 8/1962 | Great Britain. |

WENDELL E. BURNS, *Primary Examiner.*

U.S. Cl. X.R.
60—39.02, 39.06; 241—39.